United States Patent [19]

Porter

[11] 4,161,192

[45] Jul. 17, 1979

[54] TRANSFER LINE EXCHANGER INLET CONE

[75] Inventor: Chester D. Porter, Baton Rouge, La.

[73] Assignee: Allied Chemical Corporation, Morristown, N.J.

[21] Appl. No.: 861,799

[22] Filed: Dec. 19, 1977

Related U.S. Application Data

[62] Division of Ser. No. 598,107, Jul. 22, 1975, Pat. No. 4,078,292.

[51] Int. Cl.² ............................................. F15D 1/02
[52] U.S. Cl. ...................................... 138/44; 138/97; 138/98
[58] Field of Search ...................... 138/44, 97, 98, 99; 165/76, 79, 134, 158, 174; 264/30; 29/401 E

[56] References Cited

U.S. PATENT DOCUMENTS

| | | | |
|---|---|---|---|
| 2,424,825 | 7/1947 | Hogan | 264/30 |
| 2,498,924 | 2/1950 | Keller | 165/134 |
| 2,903,778 | 9/1959 | Gibson et al. | 264/30 |
| 3,145,529 | 8/1964 | Maloof | 138/44 X |
| 3,200,585 | 8/1965 | Climent et al. | 138/44 X |
| 3,202,732 | 8/1965 | Brown et al. | 264/30 |
| 3,306,351 | 2/1967 | Vollhardt | 165/158 |
| 3,374,832 | 3/1968 | Tucker | 165/134 |
| 3,416,598 | 12/1968 | Dorm | 165/134 |
| 3,433,298 | 3/1969 | Vollhardt | 165/134 |
| 3,449,212 | 6/1969 | Dorm | 165/134 X |
| 3,480,043 | 11/1969 | Proudfoot et al. | 138/99 |

FOREIGN PATENT DOCUMENTS

2407234 9/1975 Fed. Rep. of Germany ............. 264/30

*Primary Examiner*—Richard E. Aegerter
*Assistant Examiner*—James E. Bryant, III
*Attorney, Agent, or Firm*—Michael S. Jarosz

[57] ABSTRACT

This invention relates to an improved transfer line exchanger inlet cone for connecting the process gas outlet of a hydrocarbon cracking heater with the inlet of a transfer line heat exchanger, and to methods of making the same. Stress cracking and high temperature failures of the inlet cone are eliminated without affecting the flow pattern of the process gas.

4 Claims, 7 Drawing Figures

TRANSFER LINE EXCHANGER INLET CONE

This is a division, of Application Ser. No. 598,107, filed July 22, 1975 now U.S. Pat. No. 4,078,292.

BACKGROUND OF THE INVENTION

This invention relates to a transfer line exchanger inlet cone for connecting the process gas outlet of a hydrocarbon cracking heater with the inlet of a transfer line heat exchanger. In particular, it relates to an improved transfer line exchange inlet cone and to methods of making the same.

The pyrolysis of hydrocarbons to produce desired olefins and diolefins is highly endothermic. Process temperatures are usually high, ranging from 1300° to 1600° F., with the pressure normally close to atmospheric and residence time preferably short, so as to inhibit the undesirable formation of coke particles. Quench and heat recovery equipment is provided downstream from the heater in the pyrolysis reactor system to effect cooling of the reaction products from the cracking temperature, and to thereby inhibit additional secondary reactions which have an adverse effect on yield and lead to coke formation. The hydrocarbon cracking heater may be a conventional furnace comprising a row of vertical tubes with process gas therein which is heated externally to between 1300° and 1600° F. All the gas from the tubes is collected and passes through the transfer line exchanger inlet cone to the transfer line heat exchanger. The transfer line heat exchanger, which is normally installed in the vertical position above the inlet cone, comprises many small diameter tubes through which the process gas flows. Shrouding these small tubes is a jacket which contains water. The hot process gas is cooled by conduction through the tube walls to the water. The water is elevated thereby to boiling temperature, and the resulting steam can be used for power requirements in the plant.

Occasionally, tube failure will occur in the transfer line heat exchanger, resulting in water leakage into the tubes due to the water being at a much higher pressure than the gas. The water will then flow down until it impinges upon the interior of the inlet cone. Complete vaporization does not occur due to the amount of water flowing down and in some cases, due to the relatively short distance the water must travel to reach the inlet cone. In general, inlet cones are made of metal casting or fabricated metal. Cones of this type will fail by cracking when suddenly quenched by a water leak of the aforementioned type. The crack may allow the process gas to escape to the atmosphere where it will burn. This presents a potential safety hazard as personnel may be burned by the hot gas leakage. Under these circumstances, the furnace must be shut down, which will adversely affect plant production. If the inlet cone cannot be repaired, for instance by welding, then it must be replaced resulting in equipment loss. These problems may be alleviated somewhat by internally lining the inlet cones with insulation, for example, refractory. However, it is still possible for the inlet cone to crack due to water seepage if there is a flaw in the insulation or refractory lining.

It is therefore desirable to define a repair procedure for cracked inlet cones which are incapable of repair by welding and thus, normally discarded. It is also desirable to redesign the inlet cone as a preventative measure so as to inhibit interruption of furnace runs by an inlet cone failure.

Attention is drawn to the following, related U.S. Pat. Nos. 3,374,832; 3,409,074; 3,416,598; 3,443,631; 3,449,212; and 3,525,389. None of these patents teaches the repair method or the improved transfer line exchanger inlet cone of the present invention.

SUMMARY OF THE INVENTION

The present invention provides a method for repairing a cracked metal inlet cone which connects the process gas outlet of a hydrocarbon cracking heater with the inlet of a transfer line heat exchanger. The method comprises the steps of: cutting away a portion of the inlet cone's wall which has the crack therein to create an aperture in the wall; providing a pressure resistant exterior wall of metal which is connected to the inlet cone to thereby create a gap therebetween; and filling this gap with a castable refractory and extending the refractory inwardly through the aperture until the refractory is approximately flush with the interior of the wall of the inlet cone. Stress cracking and high temperature failures are eliminated without affecting the flow pattern of the process gas when using a transfer line exchanger inlet cone repaired according to this method. Surprisingly, inlet cones produced by this repair method also have a longer life span than conventional inlet cones and thus, a procedure for modification of conventional transfer line exchanger inlet cones, prior to any such cracking failure, has evolved. The method for preventing the cracking of a transfer line exchanger inlet cone of the aforementioned type comprises the steps of: cutting away a portion of the wall of said inlet cone to create an aperture in said wall; providing a pressure resistant exterior wall of metal which is connected to the inlet cone to thereby create a gap therebetween; and filling this gap with a castable refractory and extending the refractory inwardly through the aperture until the refractory is approximately flush with the interior of the wall of the inlet cone. It is preferred that the number of apertures created be four, and that each be equispaced in its respective quadrant of the wall of the inlet cone.

The apparatus of the present invention provides an inlet cone for passing gases from the outlet side of a hydrocarbon cracking heater to the tube side of a heat exchanger. The essential elements are a generally conical wall, a pressure resistant exterior wall of metal, and a castable refractory fill. The generally conical wall is connectable around the periphery of its larger end to the heat exchanger and around the periphery of its smaller end to the cracking heater. Between its larger and smaller ends, the generally conical wall has a filled aperture. The pressure resistant exterior wall of metal is spaced from the generally conical wall and its ends are connected to the generally conical wall at points above and below, respectively, the smaller and larger ends of the generally conical wall. The castable refractory fill occupies the gap between the pressure resistant exterior wall and the generally conical wall. The refractory fill extends inwardly to form the filled aperture and is approximately flush with the interior of the generally conical wall. Even if, in operation, the generally conical wall of the inlet cone is quenched and cracks due to tube failure in the heat exchanger, the flow pattern of the process gas will remain unaffected as the castable refractory fill protects the pressure resistant exterior wall. It is preferred that the number of filled apertures be four and each equispaced in its respective quadrant of the generally conical wall.

DETAILED DESCRIPTION OF THE DRAWINGS

Figure 1:
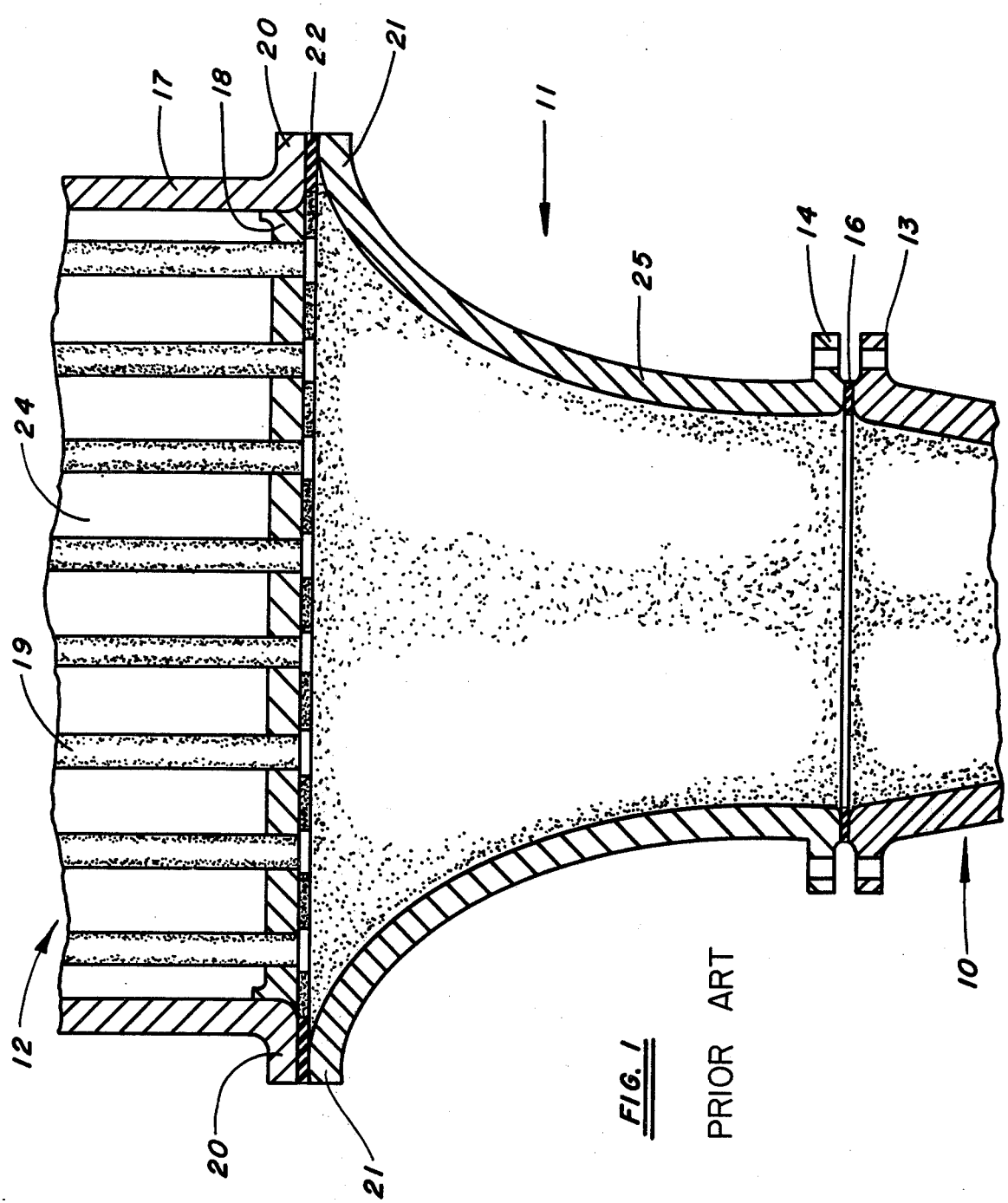
FIG. 1 is a vertical cross-section of a conventional heater outlet, inlet cone, and transfer line exchanger.
Figure 2A:
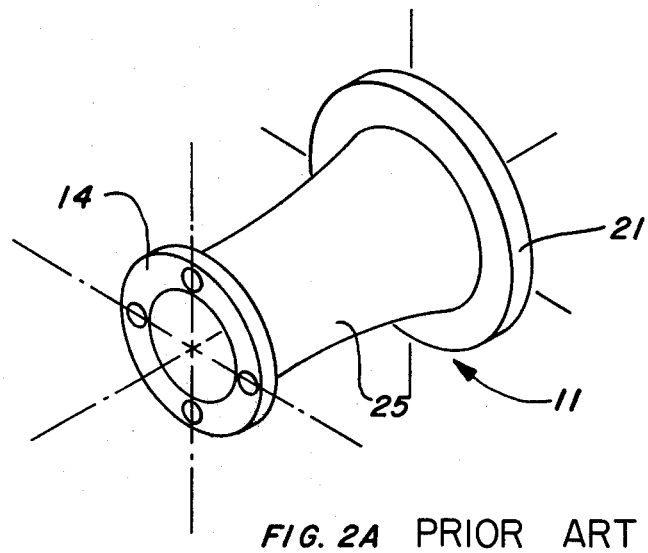
FIGS. 2A and 2B are perspective views of a conventional inlet cone and a modified inlet cone.
Figure 3A:
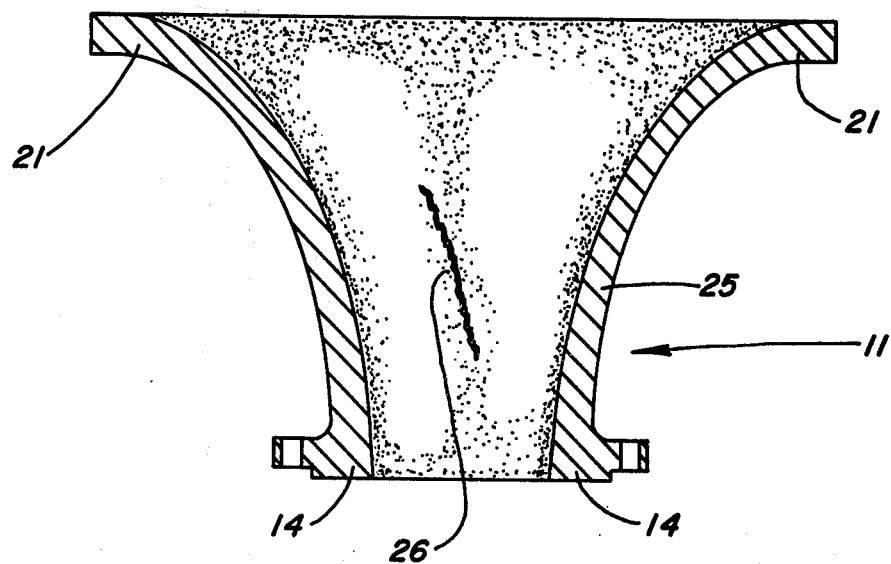
FIGS. 3A, 3B, 3C and 3D are vertical cross-sections showing the preferred procedure of repairing a cracked conventional inlet cone to obtain the modified inlet cone of the present invention.
Figure 3B:
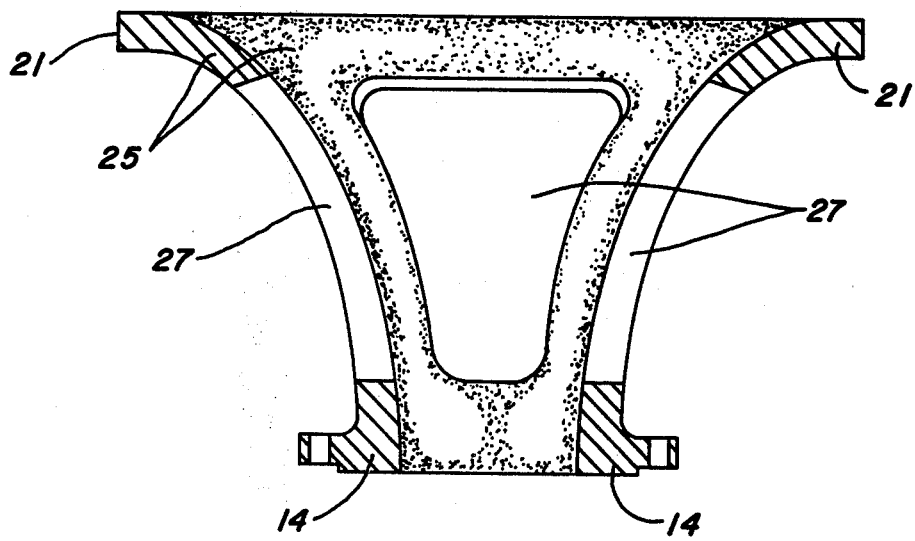
Figure 3C:
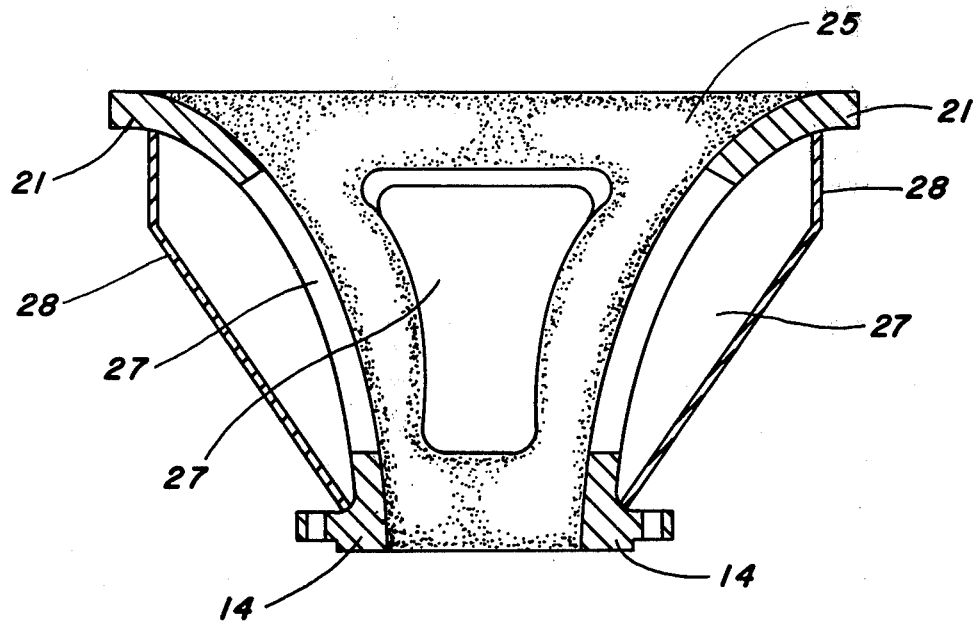

In the accompanying drawings, like numbers indicate like apparatus. With reference to FIGS. 1, 2A and 3A, a conventional inlet cone 11, which is a continuous metal casting, comprises a generally conical wall 25, flange 14 at its smaller end, and flange 21 at its larger end. Flange 14 is attached to flange 13 of heater outlet 10 by suitable means such as a plurality of bolts (not shown) and sealing gasket 16. A second gasket 22 effects a seal between flange 20 of transfer line exchanger 12 and flange 21 of inlet cone 11. Transfer line exchanger 12 comprises a shell 17, a tube sheet 18, a plurality of tubes 19, and flange 20. Only a small number of tubes 19 are shown for ease of illustration, although a larger number are preferred. Shrouding tubes 19 is a jacket containing water 24.

The hydrocarbon cracking heater may be a conventional furnace comprising a row of vertical tubes (not shown) with process gas therein which is externally heated to approximately 1560° F. Referring again to FIG. 1, all the gas from said tubes is collected and passes from heater outlet 10, through conventional inlet cone 11 to transfer line exchanger 12 where it passes through a plurality of small diameter tubes 19. Process gas pressure is approximately 14 to 20 p.s.i.g. Tubes 19 are shrouded by a jacket containing water 24. The hot process gas is cooled by conduction through the tube walls to the water 24. Water pressure is approximately 600 p.s.i.g. Occasionally, tube failure will occur in one or more of the tubes 19 of transfer line exchanger 12, resulting in water leakage into the failed tubes. The water 24 will flow down until it impinges upon wall 25 of conventional inlet cone 11, resulting in inlet cone cracking failure. To avoid the unnecessary expense of replacing the cracked inlet cone 11, and more especially to prevent future inlet cone failures, the following repair procedure with resultant modified inlet cone 11' has been devised.

With particular reference to FIGS. 3A, 3B, 3C, and 3D, the repair procedure of the present invention is as follows. FIG. 3A shows conventional inlet cone 11 with crack 26 therein. The portion of wall 25 with crack 26 therein is cut away to create aperture 27 through wall 25. It is preferred that a plurality of apertures 27 be formed, more especially four with each equispaced in its respective quadrant of wall 25. The number and spacing of apertures 27, however, may be dictated by the number and spacing of crackes. After forming apertures 27, pressure resistant exterior wall 28 (see FIG. 3C) is connected to wall 25 immediately beneath and above, respectively, flanges 21 and 14 by conventional means such as welding. It will be appreciated that apertures 27 are between these connecting points. The shape of pressure resistant exterior wall 28 is such that a gap is left between it and wall 25 except at their points of connection. This gap is filled with a castable refractory 29 (see FIG. 3D), which is extended inwardly through apertures 27 until approximately flush with the contours of wall 25. By this method, modified inlet cone 11' is formed. This is the preferred sequence of modification, as apertures 27 provide windows by which it can be ascertained that castable refractory 29 has completely filled the gap between pressure resistant exterior wall 28 and wall 25 of modified inlet cone 11'. However, pressure resistant exterior wall 28 can be affixed to wall 25 before apertures 27 are formed. Surprisingly, modified inlet cones 11' have a longer life span than conventional inlet cones 11. When the interior of modified inlet cone 11' is quenched, the uncut portions of wall 25 are still subject to cracking, but the flow pattern of the process gas is not adversely affected. As a direct consequence, the repair method of above has been transformed into a preventative procedure whereby transfer line exchanger inlet cones are modified prior to any such cracking failure.

The method for preventing the cracking of a conventional transfer line exchanger inlet cone 11 comprises essentially the same steps as for repairing a cracked one. The primary difference is that there are no cracks 26 to dictate the number and spacing of apertures 27, and therefore, the number and spacing of apertures 27 can be independently chosen. As flanges 14 and 21 are generally unaffected by quenching of the interior of wall 25, it is preferred that the height of apertures 27 be substantially therebetween. Also, it is preferable that apertures 27 be four in number, each equispaced in its respective quadrant of generally conical wall 25. Since implementation of this preventative procedure, the life of transfer line exchanger inlet cones has been greatly increased, and the probability of an inlet cone failure by cracking substantially reduced.

Figure 2B:
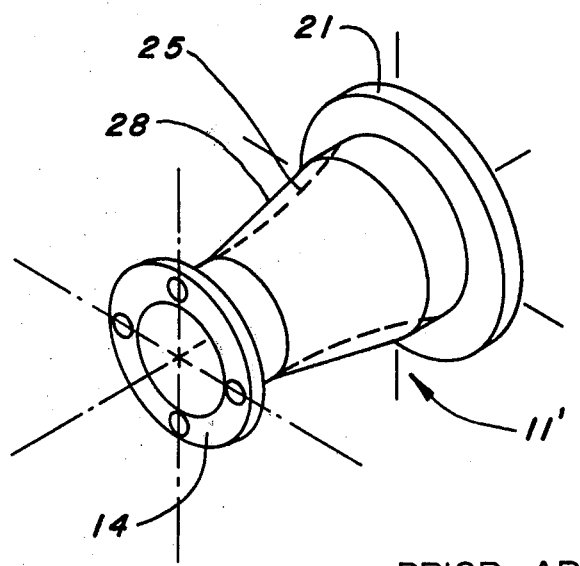
Figure 3D:
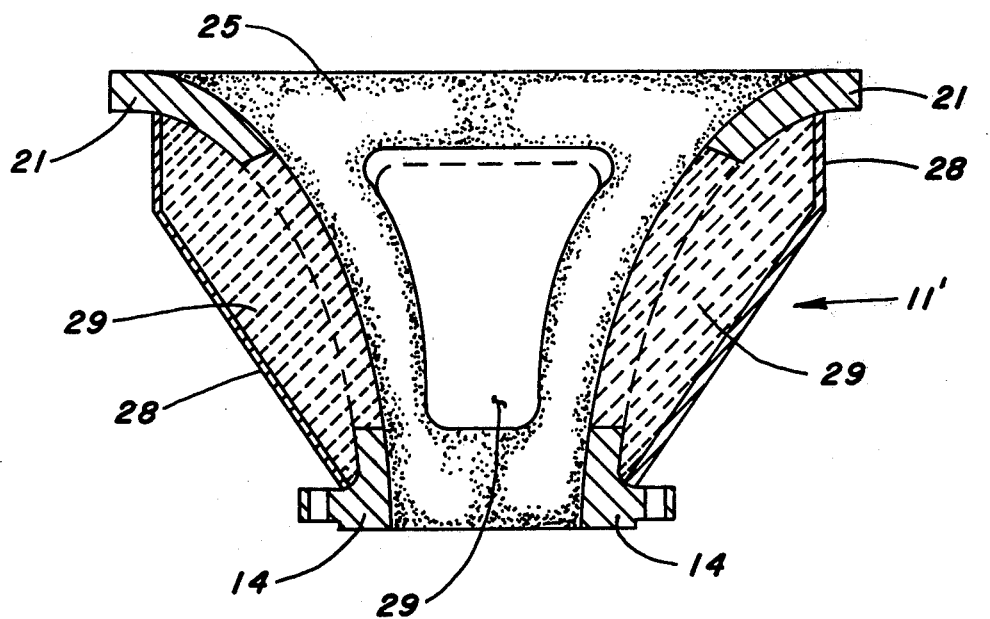

The modified transfer line exchanger inlet cone 11' of the present invention passes gases from the outlet side 10 of a hydrocarbon cracking heater to the tube side of a heat exchanger 12. Referring to FIGS. 2B and 3D, the essential elements are a generally conical wall 25, a pressure resistant exterior wall 28 of metal, and a castable refractory fill 29. Generally, conical wall 25 may be fabricated metal, but is preferably a continuous metal casting. Generally, conical wall 25 is connectable around the periphery of its larger end by flange 21 to flange 20 of the heat exchanger 12 and around the periphery of its smaller end by flange 14 to flange 13 of the cracking heater outlet 10. Between its flanges 14 and 21, generally conical wall 25 has a filled aperture 27. The pressure resistant exterior wall 28 of metal is spaced from generally conical wall 25 to create a gap therebetween, and its ends are connected to, for instance by welding, generally conical wall 25 at points above and below, respectively, flanges 14 and 21. Castable refractory fill 29 occupies the gap between pressure resistant exterior wall 28 and generally conical wall 25. The refractory fill 29 extends inwardly to form filled apertures 27 and is approximately flush with the interior of generally conical wall 25. Even if, in operation, generally conical wall 25 of the connector duct is quenched and cracks, due to tube failure in heat exchanger 12, the flow pattern of the process gas will remain unaffected as the castable refractory fill 29 protects the pressure resistant exterior wall 28.

The preferred materials of construction are as follows: for the wall of the inlet cone, fabricated steel or a metal casting, more preferably the latter; and for the pressure resistant exterior wall, a metal such as stainless steel.

Various modifications and other advantages will be apparent to those skilled in the art, and it is intended that this invention be limited only as set forth in the appended claims. In particular, while the apparatus is generally referred to herein as a "cone", it will be understood that other configurations are possible so long as they present a small opening to the outlet of a hydrocarbon cracking heater and a large opening to a transfer line heat exchanger inlet.

What is claimed is:

1. An inlet cone for passing gases from the outlet side of a hydrocarbon cracking heater to the tube side of a heat exchanger, said inlet cone comprising:
    A. a generally conical metal wall connectable around the periphery of its larger end to said heat exchanger and connectable around the periphery of its smaller end to said cracking heater, said generally conical wall having an aperture between its said larger end and its said smaller end;
    B. a pressure resistant exterior wall of metal, said pressure resistant exterior wall being spaced from said generally conical wall and having its ends connected to said generally conical wall at points above and below, respectively said smaller end and said larger end of said generally conical wall; and
    C. a castable refractory fill, said refractory fill occupying the gap between said pressure resistant exterior wall and said generally conical wall and extending inwardly to form a filled aperture, said refractory fill in said filled aperture being approximately flush with the interior of said generally conical wall.

2. The inlet cone of claim 1 wherein the number of said filled apertures is four, and each is equispaced in its respective quadrant of said generally conical wall.

3. The cone of claim 1 wherein the conical metal wall is made of metal casting and the pressure resistant exterior wall is made of stainless steel.

4. The cone of claim 2 wherein the conical metal wall is made of metal casting and the pressure resistant exterior wall is made of stainless steel.

* * * * *